US010777797B2

United States Patent
Himstedt et al.

(10) Patent No.: US 10,777,797 B2
(45) Date of Patent: *Sep. 15, 2020

(54) COMPOSITE SEPARATOR FOR LITHIUM ION BATTERIES

(71) Applicant: JOHNS MANVILLE, Denver, CO (US)

(72) Inventors: Heath H Himstedt, Littleton, CO (US); Souvik Nandi, Highlands Ranch, CO (US)

(73) Assignee: Johns Manville, Denver, CO (US)

( * ) Notice: Subject to any disclaimer, the term of this patent is extended or adjusted under 35 U.S.C. 154(b) by 18 days.

This patent is subject to a terminal disclaimer.

(21) Appl. No.: 16/378,132

(22) Filed: Apr. 8, 2019

(65) Prior Publication Data

US 2019/0237730 A1    Aug. 1, 2019

Related U.S. Application Data

(63) Continuation of application No. 15/453,800, filed on Mar. 8, 2017, now Pat. No. 10,256,445.

(51) Int. Cl.
| | |
|---|---|
| *H01M 2/16* | (2006.01) |
| *H01M 2/14* | (2006.01) |
| *H01M 10/0525* | (2010.01) |
| *H01M 2/34* | (2006.01) |
| *H01M 10/42* | (2006.01) |

(52) U.S. Cl.
CPC ......... *H01M 2/1613* (2013.01); *H01M 2/145* (2013.01); *H01M 2/1653* (2013.01); *H01M 2/348* (2013.01); *H01M 10/0525* (2013.01); *H01M 10/4235* (2013.01); *H01M 2200/103* (2013.01)

(58) Field of Classification Search
CPC .... H01M 2/1613; H01M 2/348; H01M 2/145; H01M 10/0525; H01M 2/1653; H01M 2200/103
See application file for complete search history.

(56) References Cited

U.S. PATENT DOCUMENTS

| | | |
|---|---|---|
| 2013/0112625 A1 | 5/2013 | Bahukudumbi et al. |
| 2013/0115837 A1 | 5/2013 | Kitchen et al. |
| 2014/0377628 A1* | 12/2014 | Nandi ................. H01M 2/1606 429/144 |
| 2016/0240885 A1 | 8/2016 | Nishimura |

(Continued)

*Primary Examiner* — Stewart A Fraser
(74) *Attorney, Agent, or Firm* — Robert D. Touslee

(57) ABSTRACT

A battery separator for a lithium-ion battery includes a nonwoven fiber mat that is composed of entangled microfibers having an average fiber diameter of less than 6 microns. The nonwoven fiber mat also includes a binder that binds the microfibers together and a polymer component that is dispersed homogeneously through or within the entangled microfibers so that the polymer component is uniformly distributed throughout the nonwoven fiber mat and so that the entangled microfibers, the binder, and the polymer component form a single layer component or product. The polymer component is configured to melt within the nonwoven fiber mat when exposed to a sufficiently high heat in order to effectively interrupt an electro-chemical process of the lithium-ion battery and thereby prevent overheating of the lithium-ion battery. The nonwoven fiber mat is typically between 0.1 and 20 mils thick.

20 Claims, 4 Drawing Sheets

(56) References Cited

U.S. PATENT DOCUMENTS

2016/0268567 A1  9/2016  Guo et al.
2016/0268640 A1  9/2016  Guo et al.
2017/0092916 A1  3/2017  Guo et al.

* cited by examiner

COMPOSITE SEPARATOR FOR LITHIUM ION BATTERIES

CROSS REFERENCE TO RELATED APPLICATIONS

This application is a continuation of pending U.S. application Ser. No. 15/453,800, filed Mar. 8, 2017, which is incorporated herein by reference for all purposes.

BACKGROUND

Lithium-ion batteries employ a battery separator between the anode and cathode. The battery separator is designed to physically separate the anode and cathode to prevent short circuiting of the battery. The battery separator is further designed to allow transport of the lithium ions between the anode and cathode in order to complete the circuit. Conventional lithium-ion battery separators are multi-layered products (e.g., three layered products) that are commonly made of polypropylene and polyethylene. A common lithium-ion battery separator configuration includes polypropylene outer layers and a polyethylene inner layer.

BRIEF SUMMARY

A composite separator for lithium-ion batteries is described herein. The composite separator is a single layer product that includes a homogenous or uniform composition of glass fibers and a polymer component. The polymer component is designed to melt in the presence of a sufficiently high heat to ensure that thermal runaway of the battery does not occur.

According to one aspect, a battery separator for a lithium-ion battery includes a nonwoven fiber mat having a thickness of between 0.1 and 20 mils. The nonwoven fiber mat is composed of a plurality of entangled glass microfibers that includes: between 20 and 70 weight percentage of smaller sized glass microfibers having an average fiber diameter of between 150 and 550 nanometers; between 0 and 15 weight percentage of larger sized glass microfibers having an average fiber diameter of between 0.6 and 6 microns; and between 10 and 60 weight percentage of a binder that binds the smaller sized glass microfibers and the larger sized glass microfibers together. The smaller sized glass microfibers and the larger sized glass microfibers are substantially homogenously or uniformly distributed and blended throughout the nonwoven fiber mat. The nonwoven fiber mat also includes between 0 and 60 weight percentage of a polymer component that is homogenously dispersed within the nonwoven fiber mat so that the battery separator has a single layer structure. The polymer component has a melting point of less than about 150 degrees Celsius so that when exposed to a sufficiently high temperature, the polymer component melts within the nonwoven fiber mat and disrupts the electro-chemical reaction of the lithium-ion battery. The battery separator also exhibits a puncture resistance of at least 2 pounds per square inch (lbs/in$^2$) and a strength of at least 0.8 pounds per inch (lbs/in).

In some instances, the polymer component includes polypropylene, polyethylene, or a combination thereof. The polymer component may include polypropylene fibers, polyethylene fibers, or a combination thereof and/or the polymer component may include a polymer emulsion. In some instances, the nonwoven fiber mat is substantially free of fibers having a diameter smaller than 150 nm and/or is substantially free of (or does not include) fibers having a diameter greater than 6 μm.

According to another aspect, a battery separator for a lithium-ion battery includes a nonwoven fiber mat having a thickness of between 0.1 and 20 mils. The nonwoven fiber mat is composed of a plurality of entangled microfibers having an average fiber diameter less than 6 microns, a binder that binds the microfibers together, and a polymer component that is dispersed homogeneously through the plurality of entangled microfibers. The polymer component is uniformly distributed throughout the nonwoven fiber mat and is not concentrated in any area or adjacent one or more layers within the nonwoven fiber mat. The nonwoven fiber mat, binder, and polymer component form a single layered component rather than a multi-layered component as is employed in conventional lithium-ion batteries. The polymer component is configured to melt within the nonwoven fiber mat when exposed to a sufficiently high heat in order to effectively interrupt an electro-chemical process of the lithium-ion battery and thereby prevent overheating of the battery.

In some instances, the plurality of entangled microfibers includes glass microfibers having an average fiber diameter of between 150 and 550 nanometers and/or includes glass microfibers having an average fiber diameter of between 0.6 and 6 microns. The nonwoven fiber mat exhibits a puncture resistance of at least 2 lbs/in$^2$ and a strength of at least 0.8 lbs/in. The battery separator may include between 0 and 60 weight percentage of the polymer component, which may include or consists of polypropylene or polyethylene chains. The nonwoven fiber mat may be substantially free of fibers having a diameter smaller than 200 nm and/or substantially free of fibers having a diameter greater than 6 μm.

Accordingly to another aspect, a method of manufacturing a battery separator for a lithium-ion battery includes dispersing glass microfibers in an aqueous environment to form an aqueous slurry of the glass microfibers. A polymer component is also dispersed within the aqueous slurry of the glass microfibers so that the polymer component is homogenously or uniformly distributed throughout the aqueous slurry. The aqueous slurry is distributed onto a screen and a liquid is removed from the aqueous slurry so as to form a nonwoven fiber mat that is composed of entangled glass microfibers and the polymer component. The polymer component is homogenously or uniformly distributed throughout the entangled glass microfibers. A binder is applied to the entangled glass microfibers to bond the glass microfibers together with the polymer component homogenously distributed there through. The entangled glass microfibers are dried to form a nonwoven fiber mat having a thickness of between 0.1 and 20 mils. The polymer component is configured to melt within the nonwoven fiber mat when exposed to a sufficiently high heat in order to effectively interrupt an electro-chemical process of the lithium-ion battery and thereby prevent overheating of the battery.

In some instances, the liquid is removed at a rate that is sufficient to uniformly or homogenously disperse the polymer component throughout the entangled glass microfibers. In some instances, dispersing the glass microfibers in an aqueous environment includes dispersing between 20 and 70 weight percentage of smaller sized glass microfibers in the aqueous environment, in which the smaller sized glass microfibers have an average fiber diameter of between 150 and 550 nanometers. Dispersing the glass microfibers in an aqueous environment may further include dispersing between 0 and 15 weight percentage of larger sized glass microfibers within the aqueous environment, in which the larger sized glass microfibers have an average fiber diameter of between 0.6 and 6 microns. The smaller sized glass microfibers and the larger sized glass microfibers are homogenously or uniformly distributed within the aqueous slurry. Dispersing the polymer component within the aqueous slurry of the glass microfibers may include dispersing between 0 and 60 weight percentage of the polymer component within the aqueous slurry. Dispersing the polymer component within the aqueous slurry of the glass microfibers may include dispersing polymer fibers and/or a polymer emulsion within the aqueous slurry.

BRIEF DESCRIPTION OF THE DRAWINGS

The present invention is described in conjunction with the appended figures.

Figure 1:
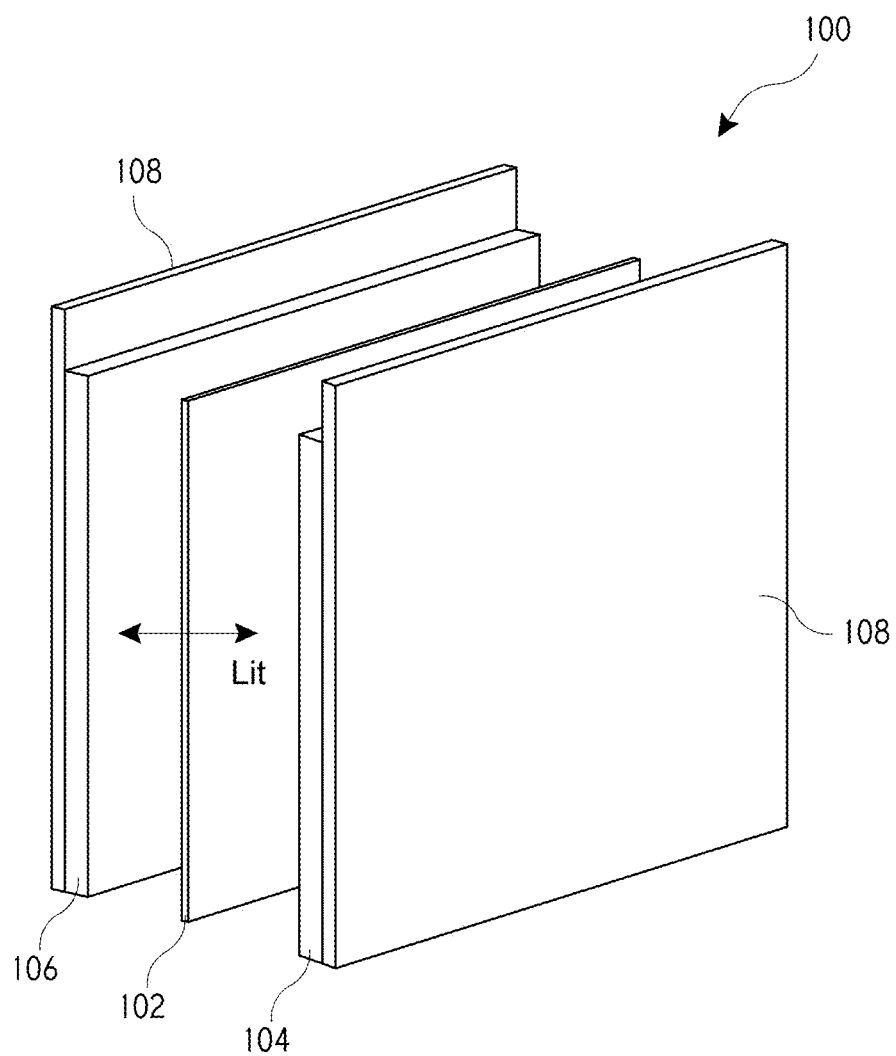
FIG. 1 illustrates a cell of a lithium-ion battery.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

The embodiments herein are direct toward a composite nonwoven media mat which incorporates fibers (commonly glass fibers) and polymer components. The finished media combines the mechanical strength and chemical resistance of the fibers with the mechanical flexibility and thermal properties of polymers. The intended use of the nonwoven media mat is as a separator within a lithium ion battery. The final product is lightweight, very thin, and mechanically strong. A unique aspect of the nonwoven media mat is the intimate mixing of the glass fibers and polymer components to create a single layer battery separator, which typically has reduced thickness in comparison with conventional separators. For example, the conventional industry standard for lithium ion separators is a multi-layer mat made of polypropylene and polyethylene. At higher temperatures these mats can degrade, which can lead to short circuiting of the battery. Fiber mats or coatings can be added to these conventional mats to increase the thermal resistance and mechanical strength; however, the resulting separator is substantially thicker, which reduces battery efficiency. Mats produced from polyvinylidene fluoride (pVDF) can be used, which are thermally stable, but these mats are too brittle to survive processing and manufacture into the battery component.

The unique single layer separator described herein combines the desired properties of both glass and polymers into a thinner product, which increases battery capacity and efficiency. The polymer component is employed as a safety feature and is designed to melt above a certain temperature and fill in the free space or pores of the mat, thereby shutting down ion transport and preventing battery overheating. In some embodiments, the polymer component may be polypropylene or polyethylene, which have melt temperatures of around 130° C. and 110° C. The glass fibers provide thermal stability and good mechanical strength. The resulting separator is a single layer mat with glass and polymer fibers dispersed throughout the single layer may. The single layer mat is substantially thinner than conventional mats without sacrificing strength or safety performance.

Lithium-ion batteries are commonly made of multiple cells. Each cell is a basic electrochemical unit that includes an anode or negative electrode, a cathode or positive electrode, a separator, and an electrolyte. Each cell is designed to provide a certain voltage (e.g., 3.3 V, 3.7 V, and the like). The total voltage of the battery is determined by the number of cells the battery employs and the voltage provided by each cell. The battery houses the individual cells and typically electrically connects each of the cells. The battery may also include electronics or electronic circuits that are designed to control and protect the cells from failure.

FIG. 1 illustrates a cell 100 of a lithium-ion battery. The cell 100 includes an anode 106 and a cathode 104 that are physically separated by a separator 102. A current collector material 108 is also attached to the anode 106 and cathode 104, which is used to transport the generated current from the cell to a terminal. The anode 106 or negative electrode can be made of various materials including graphite, lithium titanate, carbon, silicon, tin/cobalt alloy, or combinations thereof. Carbon materials, such as graphite, are commonly used, as is silicon. The cathode 104 or positive electrode can also be made of various materials including cobalt, manganese, nickel, iron, phosphate, and the like, with the most common being $LiCoO_2$ and $LiMn_2O_4$.

Both the anode 106 and the cathode 104 allow lithium ions to move in and out of their interiors. During discharge, the positive lithium ions flow or move from the anode 106, through the separator 102, and to the cathode 104. Similarly, during charging, the positive lithium ions flow or move from the cathode 104, through the separator 102, and to the anode 106.

The electrolyte provides a conductive medium for Lithium-ions to move between the anode 106 and cathode 104 and across the separator 102. The cell 100 may include either a liquid or non-liquid electrolyte, which are known in the art. The electrolyte provides a conductive pathway for the movement of the cations passing between the positive and negative electrodes.

The separator 102 is used to physically separate the anode 106 and cathode 104 to prevent short circuiting of the cell 100. The separator 102 needs to be sufficiently porous to enable movement of the cations across the separator 102 and between the anode 106 and cathode 104. As described herein, short circuiting of the cell 100 can result in thermal runaway or overheating of the cell 100, which can result in an explosion and/or fire. Short circuiting may be caused by dendrite growth due to repeated charging and discharging of the cell 100. The separator 102 should be sufficiently puncture resistant in order to prevent the dendrite growth from puncturing the separator 102 and short circuiting the cell 100. As a safety feature, the separator 102 should also be able to shut down the electro-chemical process in case overheating or thermal runaway occurs.

Lithium-ion batteries offer several advantages over other batteries, such as conventional lead-acid batteries. Some of the advantages that are offered include being typically lighter than other batteries for a given capacity, delivering a high open-circuit voltage; a low self-discharge rate, a reduced battery memory effect, reduced toxic landfill, etc. Lithium-ion batteries, however, are prone to some issues and/or safety concerns such as thermal runaway, which may occur if the battery is overheated or overcharged.

Thermal runaway occurs when the cell 100 becomes thermally unstable, which can lead to a spike in temperature within the cell 100 that may result in catastrophic failure of the cell and/or battery. During thermal runaway, the high heat of the failing cell 100 can propagate to adjacent cells within the battery, which may cause the adjacent cells to become thermally unstable. A chain reaction may result within the battery, which may lead to rupture of the cell 100 and/or fire, or an explosion in extreme cases. Thermal runaway can be initiated from various sources including overcharging, charging at a voltage that is too great, dendrite growth with the cell 100, or other overheating or short circuiting events.

Lithium-ion battery separators are designed to prevent thermal runaway. Conventional lithium-ion battery separators have a three layer structure with polypropylene outer layers and a polyethylene inner layer. The polyethylene inner layer is designed to prevent thermal runaway by melting and closing off pores in the polypropylene outer layers. This prevents ion transport across the separator, which effectively halts the electro-chemical process.

In some instances, the heat that is generated during thermal runaway of conventional lithium-ion separators may be sufficiently high such that the polypropylene outer layers and/or polyethylene inner layer burn. Burning of these layers may result in a hole that exposes the anode 106 and cathode 104, which may cause the cell 100 to short circuit and thereby result in rapid overheating of the cell 100 and the issues associated therewith.

In contrast to conventional lithium-ion battery separators, the embodiments described herein are directed toward a single layer nonwoven fiber mat that includes a polymer ion suppressing material homogeneously or uniformly distributed through the nonwoven fiber mat. The term ion suppressing material as used herein means any polymer component that may be incorporated into a battery separator and that is configured to prevent thermal runaway of a lithium-ion battery. In an exemplary embodiment, the polymer ion suppressing material is a polymer component that is designed to melt in response to overheating of the lithium-ion battery and close off the pores of the battery separator, such as by forming a film within or on one or more sides of the separator. In some instances, the polymer component may have a melting temperature of between 90 and 150 degrees Celsius, and more commonly between 110 and 130 degrees Celsius. In a specific embodiment the polymer used may be entirely polyethylene or polypropylene which have a melting temperature of about 110 and 130 degrees Celsius, respectively. Exemplary polymer components include polyolefins such as polypropylene and polyethylene, although the polymer components may include any polymer with a suitable melting temperature, such as ABS.

In the mats described herein, the polymer ion suppressing material (hereinafter polymer component) is homogenously or uniformly dispersed or distributed through the nonwoven fibers of the mat so that the nonwoven fiber mat is a single layer component having uniform properties, materials, and characteristic throughout the mat. The single layer configuration of the nonwoven fiber mat is different than conventional lithium-ion battery separators, which typically include two or more layers with each layer having different properties, materials, and/or characteristics. The single layer nonwoven fiber mat battery separator is able to physically separate the anode 106 and cathode 104 of the lithium-ion battery cell 100 while enabling sufficient transport of the positive lithium ions across the separator. The single layer nonwoven fiber mat battery separator is also able to effectively interrupt the electro-chemical process in response to overheating or runaway of the battery due to the homogenous or uniform dispersion of the polymer component within the nonwoven fiber mat.

In some embodiments, the nonwoven fiber mat is composed substantially or entirely of microfibers. Stated differently, the nonwoven fiber mat may not include, or may otherwise be free of, coarse fibers or larger diameter fibers. As used herein, the term microfiber means fibers that have an average fiber diameter of 6 μm or less. It should be understood that normally deviations from the average fiber diameter are included within the term and that such deviations are envisioned in the embodiments described herein. For example, the reference to microfibers having an average fiber diameter of 6 μm implies that some of the fibers may have a diameter greater than 6 μm and that some of the fibers may have a diameter smaller than 6 μm, but that on average, the fiber diameters collectively average 6 μm. Similar rational applies to any of the claimed or described numerical values or ranges, such as other claimed or described fiber diameters or fiber diameter ranges.

In an exemplary embodiment, the microfibers are glass fibers, although polymer fibers or a combination of polymer and glass microfibers may be used. Other temperature resistant materials may also be employed, such as small ceramic fibers or beads, graphene or carbon tubes, and the like. Due to the significantly higher melting point of glass fibers in comparison with polymer fibers, the use of glass microfibers minimizes the risk of burning and/or other problems that may be associated with polymer fibers. The use of the polymer fibers within the nonwoven fiber mat, however, may increase the strength, integrity, and/or flexibility of the nonwoven fiber mat and thus, in some embodiments a combination of glass and polymer fibers is employed.

The use of the microfibers in the exemplary embodiments enables the mat thickness to remain exceptionally thin. The desired thinness of the mat may be difficult to achieve when coarse fibers (i.e., fibers having an average fiber diameter of greater than 6 μm) are incorporated into the mat in any significant or substantial amount. A percent of coarse fibers that is too great may also create areas of greater porosity or concentrations of the fibers, which may negatively affect the performance of the separator. In some embodiments the mat may include some coarse fibers, which are fibers have an average fiber diameter that is greater than 6 μm. For example, the glass fibers having fiber diameters within the range of 7 to 17 microns may be used. In such embodiments, the amount of coarse fibers is typically minimal to enable the mat to remain thin. For example, the mat may include between 5 and 35% of the coarse fibers.

In some embodiments, the nonwoven fiber mat includes a combination of different sized microfibers. The different sized microfibers will be described herein as "fine or smaller sized microfibers" and "coarse or larger sized microfibers". As described herein, in an exemplary embodiment substantially all, or entirely all, the fine and coarse sized microfibers are glass fibers. The term fine or smaller sized microfibers refers to fibers having an average fiber diameter of between 150 and 550 nanometers, and more commonly between 250 and 450 nanometers. The term coarse or larger sized microfibers refers to fibers having an average fiber diameter of between 0.6 and 6 microns, and more commonly between 650 and 1,000 nanometers. In a specific embodiment, the nonwoven fiber mat does not include fibers having an average diameter smaller than 200 nm.

An increase in the number of fine sized microfibers may be used to reduce the thickness of the mat and to reduce the permeability and porosity of the mat. The inclusion of too many fine sized microfibers, however, may compromise the integrity of the nonwoven fiber mat and may cause the mat to rip or tear in response to tension exerted during manufacturing of the mat or assembly of the mat within the cell 100.

The polymer component is integrated or incorporated within the fiber matrix (e.g., glass fiber/glass microfiber matrix) so that a separate layer, or multiple layers, of the polymer component is not needed. Since the polymer component is included within the fiber matrix, the nonwoven fiber mat is relatively thin and strong compared with conventional lithium-ion battery separators. For example, the nonwoven fiber mat typically has a thickness of between 0.1-20 mils, and more commonly between about 0.1-10 mils. In a specific embodiment, the fiber mat has a thickness of less than 5 mils and more commonly less than 3 mils, such as between 1-3 mils or between 1-2 mils. It should be appreciated that the ranges provided herein, such as the thickness of the mat, are ranges that cover an average value of the mat and that a person of skill would understand that some deviations from the average value could or would occur within the mat. For example, while the thickness of the mat is described as less than 3 mils or between 1-3 mils, it should be understood that some portion or area of the mat may have a thickness that is outside this range (i.e., greater than 3 mils), but that the average thickness of the mat will be within the claimed or described 1-3 mil, or less than 3 mil, range. A similar rationale applies to the other ranges claimed or described herein.

The nonwoven fiber mat also exhibits a strength of 0.8 to 20.0 pounds per inch and typically between 2 and 4.8 pounds per inch when measured on a vertical paper or paperboard tensile testing apparatus with a 100 pound load cell and a pull rate of one inch per minute tested according to ASTM D828 and a puncture resistance of at least 2 pounds per square inch when tested according to ASTM D774. The nonwoven also exhibits a maximum air perm of 1.5 cm/s at 12.16 mbar, typically less than 1 cm/s, and usually between 0.4 and 0.8 cm/s. The use of microfibers greatly decreases the air perm in comparison with conventional glass mat based separators. The added polymer component (e.g., polypropylene emulsion) may further reduce the air perm to within the described range. The nonwoven fiber mat described herein have a weight of between 10 and 100 grams per square meter (gsm), and more commonly between 20 and 50 gsm.

The single layer construction also enables the nonwoven fiber mat to achieve the described thinness. The thinness may not be achieved if a bi-layer or multilayer arrangement is achieved, such as when the polymer component is coated on one or more sides of the microfiber nonwoven fiber mat or when a polymer film is positioned on one side of the mat.

In some embodiments, the polymer component is a solid form as polymer fibers in a colloidal suspension or in liquid form as a polymer emulsion. Here colloidal suspension and emulsion describe a mixture of two immiscible components, that is, the polymer and a carrier phase which will not solvate the polymer.

Exemplary Nonwoven Mat

Figure 3:
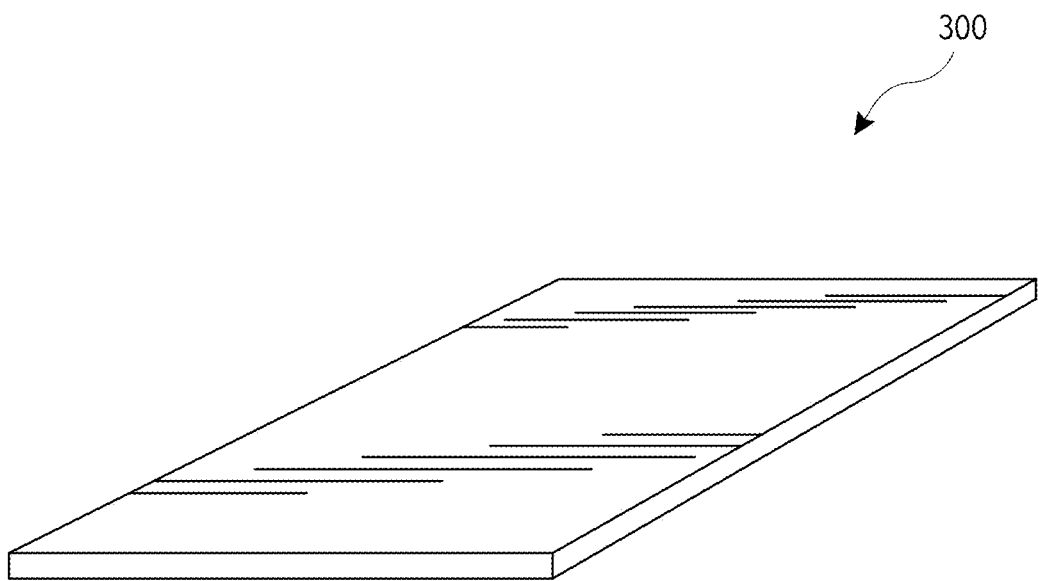
FIG. 3 illustrates a nonwoven fiber mat that may be employed as a battery separator for a lithium-ion battery.

Referring now to FIG. 3, illustrated is a nonwoven fiber mat 300 that is designed to function as a battery separator for a lithium-ion battery. The nonwoven fiber mat 300 is a single layer (i.e., not multilayered) product with all the various components (e.g., the binder, microfibers, polymer component, etc.) uniformly distributed or dispersed throughout the mat. The nonwoven fiber mat 300 has a thickness T of between 0.1 and 20 mils, and more commonly between 0.1 and 10 mils, and most commonly 3 mils or less. The nonwoven fiber mat 300 is also composed substantially or entirely of a plurality of entangled microfibers, which have an average fiber diameter less than 6 microns. The nonwoven fiber mat 300 is typically square or rectangular in configuration and may be sized appropriately for use in a given lithium-ion cell.

Figure 2A:
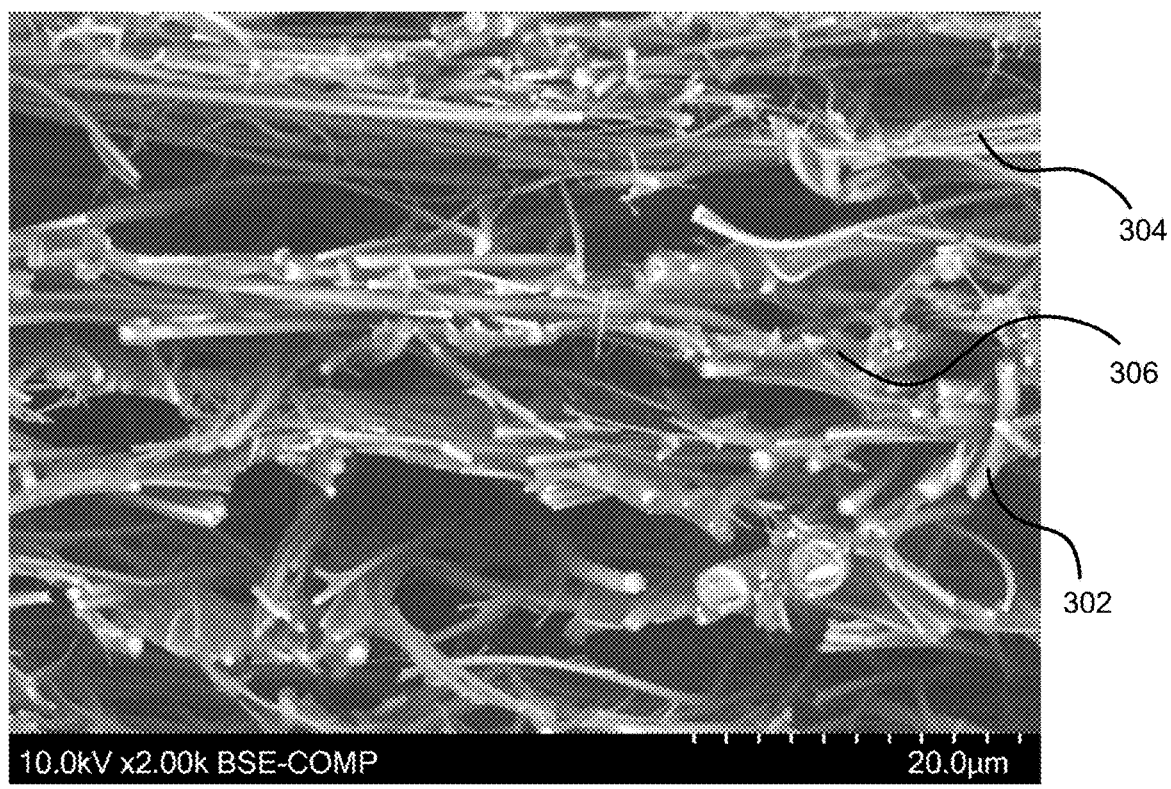
FIGS. 2A-B illustrate a cross section of a nonwoven fiber mat that may be employed as a battery separator for a lithium-ion battery.
Figure 2B:
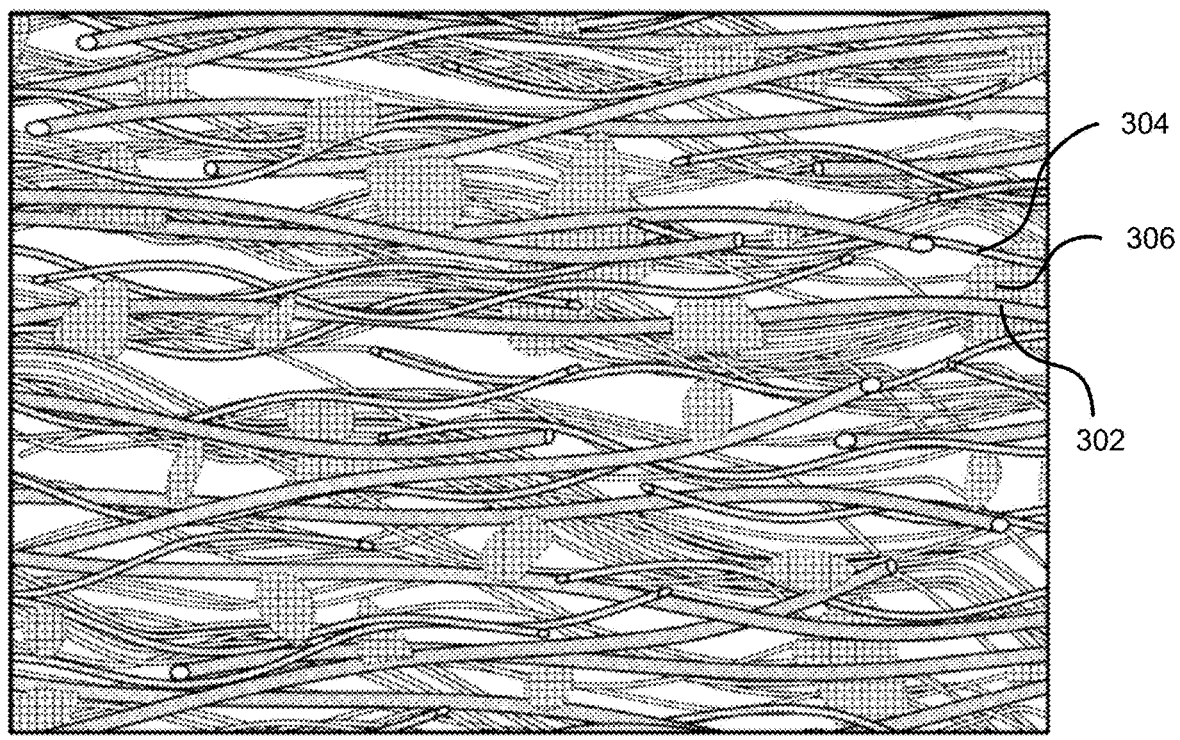

In an exemplary embodiment, the entangled microfibers consist of, or consist essentially of, glass fibers. In other embodiment, the entangled microfibers comprise a combination of glass fibers and polymeric fibers. FIGS. 2A-B illustrate cross sections of a nonwoven fiber mat and show the entangled microfibers 200 according to one embodiment. FIGS. 2A-B further illustrates the homogenous or uniform dispersion or distribution of the various components (e.g., polymer component, polymer fibers, binder, additives, etc.) within or among the entangled microfibers. FIG. 2A is a scanning electron microscope (SEM) cross sectional image of a nonwoven fiber mat that was formed in accordance with the disclosure herein. The SEM image shows a homogenous or uniform dispersion of larger sized microfibers 302, smaller sized microfibers 304, and polymer component 306 throughout the nonwoven fiber mat. FIG. 2B is a representation of the SEM image of FIG. 2A and likewise shows a homogenous or uniform dispersion of larger sized microfibers 302, smaller sized microfibers 304, and polymer component 306 throughout the nonwoven fiber mat. Although the polymer component 306 is illustrated in FIG. 2B as clumps or concentrations of material, the polymer component 306 is typically spread among and over the larger sized microfibers 302 and the smaller sized microfibers 304 as depicted in FIG. 2A so that the polymer component has a film or sheet-like form or configuration.

In some embodiments, the microfibers of the nonwoven fiber mat 300 include a combination of smaller sized microfibers and larger sized microfibers, each or both of which may include or consist of glass fibers. The smaller sized microfibers may have an average fiber diameter of between 150 and 550 nanometers while the larger sized microfibers have an average fiber diameter of between 0.6 and 6 microns. In an exemplary embodiment the smaller sized microfibers have an average fiber diameter of between 250 and 450 nanometers and the larger sized microfibers have an average fiber diameter of between 650 and 1,000 nanometers. In some embodiments, the nonwoven fiber mat 300 may include between 20 and 70 weight percentage of smaller sized glass microfibers, and more commonly between 30 and 60 weight percentage of smaller sized glass microfibers, and most commonly between 30 and 40 weight percentage of smaller sized glass microfibers. The nonwoven fiber mat 300 may also include between 0 and 15 weight percentage of larger sized glass microfibers, and more commonly between 1 and 6 weight percentage of larger sized glass microfibers, and most commonly between 2 and 4 weight percentage of larger sized glass microfibers. The smaller sized glass microfibers and the larger sized glass microfibers are substantially homogenously or uniformly distributed and blended throughout the nonwoven fiber mat.

In a specific embodiment, the nonwoven fiber mat 300 is substantially free of, or otherwise does not include, microfibers having a diameter, or average diameter, smaller than 200 nm. The inclusion of microfibers with diameters smaller than 200 nm in an appreciable amount may significantly negatively affect the integrity, puncture resistance, or strength of the nonwoven fiber mat 300. For example, given the extremely small diameter and length of these fibers, the fibers may have difficulty bonding or entangling together, which may negatively impact the puncture resistance and strength when these fibers are present in an appreciable or significant amount. The nonwoven fiber mat 300 may likewise be substantially free of, or otherwise not include, fibers having a diameter, or average diameter, greater than 6 µm. While fibers having a diameter greater than 6 µm may increase the puncture resistance and strength of the mat, an appreciable or significant amount of these fibers may render the mat thicker than the desired 3 mil or 10 mil or less thickness. Fibers having a diameter greater than 6 µm may also clump together, thereby negatively affecting the homogenous or uniform dispersion of the other components of the nonwoven fiber mat 300.

The nonwoven fiber mat 300 also includes a binder that binds the microfibers together. The binder may be any chemical, which upon application of heat, will set or cure in order to bind the glass fibers to one another to form a mat. Binders based on urea formaldehyde and acrylics are the two most prevalent; however, other chemistries may be used as well. In some embodiments, the nonwoven fiber mat 300 includes between 10 and 60 weight percentage, and more commonly between 20 and 55 weight percentage, of a binder that binds the microfibers together—e.g., the smaller sized glass microfibers and the larger sized glass microfibers together. The nonwoven fiber mat 300 further includes a polymer component that is dispersed homogeneously through the entangled microfibers so that the polymer component is uniformly distributed throughout the nonwoven fiber mat 300 and is not concentrated in any area or adjacent one or more layers within the nonwoven fiber mat. The polymer component is configured to melt within the nonwoven fiber mat 300 when exposed to a sufficiently high heat in order to effectively interrupt an electro-chemical process of the lithium-ion battery and thereby prevent overheating of the battery.

In some embodiments, the nonwoven fiber mat 300 includes between 5 and 60 percent by weight, and more commonly between 7.5 and 15 percent by weight, of a polymer component. The polymer component may have a melting point of between 90 and 150 degrees Celsius, and more commonly between about 110 and 130 degrees Celsius, such that when exposed to a sufficiently high temperature, the polymer component melts within the nonwoven fiber mat 300 and disrupts the electro-chemical reaction of the lithium-ion battery. The polymer component may disrupt the electro-chemical reaction of the lithium-ion battery by closing off openings or pores through which the lithium ions move, flow, or otherwise pass.

The nonwoven fiber mat 300 is also configured to exhibit a puncture resistance of at least 2 pounds per square inch and a strength of at least 0.8 pounds per inch.

In some embodiments, the polymer component may include polyolefins such as polypropylene or polyethylene. The polymer component may include or consist of polymer chains and may be introduced into the nonwoven fiber mat 300 as polymer fibers, an emulsion, or a combination thereof. When polymer fibers are used, the fibers may have an average fiber diameter of between 0.5 and 2 microns and a length that is orders of magnitude greater than the diameter (typically greater than 10 cm), specifically an aspect ratio no less than 1,000 and typically greater than 10,000.

EXEMPLARY PROCESS

As described briefly above, the single layer separator described herein is a wet-laid mat comprised of glass microfibers and a polymeric component, which typically includes or consist of polypropylene chains. The polymer chains could be introduced as polymer fibers or via another route, for example as an emulsion. The glass microfibers, polymer chains, binder, and other additives, such as additives that aid in processing (e.g., dispersing agents, surfactants, etc.), are mixed under sufficiently high shear to form a homogenous slurry. The final mat is produced by collecting the fibers onto a collection belt and then drying the collected fibers in an oven. The final product is a single layer nonwoven fiber mat in which all the components (i.e., the fibers, polymeric component, binder, etc.) are homogenously or uniformly dispersed or distributed throughout the mat.

In some instances, homogenous dispersion is achieved by using the appropriate amount of the polymeric component (e.g., polypropylene) and by applying the vacuum at the appropriate rate, which is typically a high vacuum rate. The components are mixed in the slurry so that they are homogenously or uniformly dispersed in the slurry. If the sufficient vacuum force is applied, the components are sucked or vacuumed down in a manner that results in the components remaining homogenously or uniformly dispersed. If the suction is inadequate and/or if an insufficient amount of the polymeric component is added, then a poor dispersion of the components may result and the polymeric component and/or microfibers may conglomerize or clump together. Typically, the vacuum is applied so that the liquid is removed at a rate that is fast enough to prevent agglomeration of the slurry components.

Figure 4:
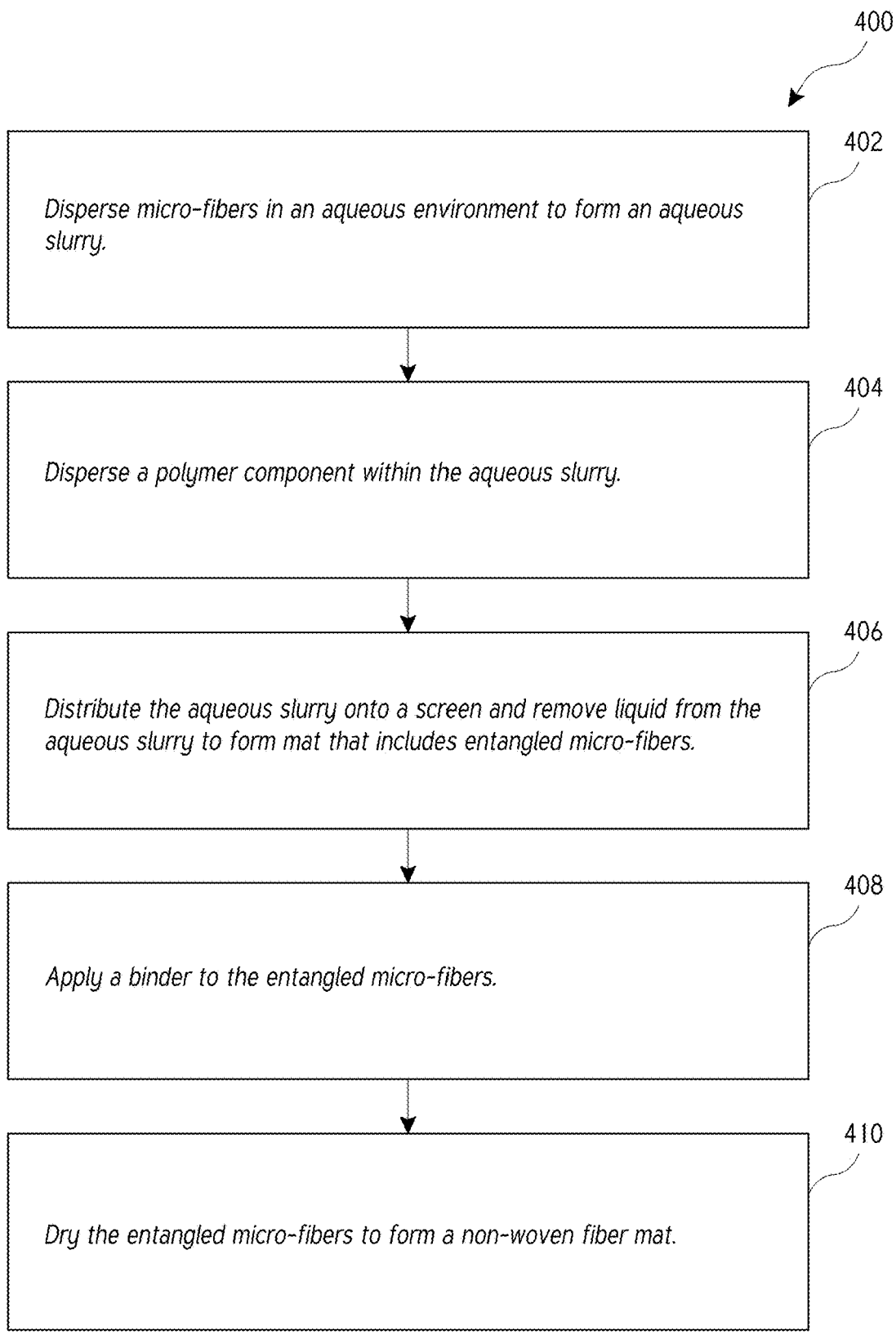
FIG. 4 illustrates a method of manufacturing a nonwoven fiber mat that may be employed as a battery separator for a lithium-ion battery.

Referring now to FIG. 4, illustrated is a method 400 of manufacturing a nonwoven fiber mat that may be employed as a battery separator for a lithium-ion battery. At block 402, microfibers, and more commonly glass microfibers, are dispersed in an aqueous environment to form an aqueous slurry of the microfibers. The microfibers (hereinafter glass microfibers) are typically homogenously or uniformly dispersed in the aqueous environment. At block 404, a polymer component is dispersed within the aqueous slurry of the glass microfibers so that the polymer component is homogenously or uniformly mixed or distributed throughout the aqueous slurry. At block 406, the aqueous slurry is distributed onto a screen and a liquid is removed from the aqueous slurry so as to form a wet-laid nonwoven fiber mat atop the screen. The wet-laid nonwoven fiber mat is composed of entangled glass microfibers and the polymer component, with the polymer component homogenously or uniformly distributed throughout the entangled glass microfibers.

At 408, a binder is applied to the entangled glass microfibers to bond the glass microfibers together with the polymer component homogenously distributed through or within the glass microfibers. The binder could be applied to the aqueous slurry of homogenously or uniformly mixed glass microfibers and polymer component before the liquid is removed with the screen/vacuum, or the binder could be applied after the initial dewatering process. At block 410, the wet-laid nonwoven fiber mat (i.e., the entangled glass microfibers) are dried to form a nonwoven fiber mat having a thickness of between 0.1 and 20 mils, and more commonly between 0.1 and 10 mils, and most commonly less than 3 mils. The polymer component that is incorporated within the nonwoven fiber mat is configured to melt within the nonwoven fiber mat when exposed to a sufficiently high heat in order to effectively interrupt an electro-chemical process of the lithium-ion battery and thereby prevent overheating of the battery.

In an exemplary embodiment, the liquid is removed at a sufficiently high rate in order to uniformly or homogenously disperse the polymer component throughout the entangled glass microfibers. In some embodiments, dispersing the glass microfibers in an aqueous environment includes dispersing 20 and 70 weight percentage of smaller sized glass microfibers in the aqueous environment and/or 0 ad 15 weight percentage of larger sized glass microfibers within the aqueous environment. The smaller sized glass microfibers may have an average fiber diameter of between 150 and 550 nanometers and the larger sized glass microfibers may have an average fiber diameter of between 650 and 1000 microns. The smaller sized glass microfibers and the larger sized glass microfibers are homogenously or uniformly distributed within the aqueous slurry.

Dispersing the polymer component within the aqueous slurry of the glass microfibers may include dispersing 0 and 60 weight percentage of the polymer component within the aqueous slurry. Dispersing the polymer component within the aqueous slurry of the glass microfibers may also include dispersing polymer fibers and/or a polymer emulsion within the aqueous slurry. The uniform dispersion of the polymer component within the resulting nonwoven fiber mat may aid in a more uniform and predictable melting of the polymer component. For example, the melting of the polymer component may be more responsive to increased temperature due to the homogenous dispersion of the polymer component within the nonwoven fiber mat. The homogenous dispersion of the polymer component ensures that at least some of the polymer component is in direct contact with the heat source and therefore is more likely to melt at a sufficiently high temperature. The homogenous dispersion and uniform layer of the polymer component ensures that an insulating layer of material is not positioned between the polymer component and the heat source. For example, the polypropylene outer layer of conventional lithium ion separators may insulate the polyethylene middle layer, which may allow the battery to overheat to dangerous levels. Since the polymer component in the instant application is in direct contact with the heat source, the polymer component may heat up quicker than in conventional lithium ion separators, which may result in a quicker melting of the polymer component and a quicker elimination or prevention of thermal runaway. In addition, the homogenous dispersion and uniform layer of the polymer component helps ensure that melting occurs across or through the entire nonwoven fiber mat rather than merely within a dedicated separate polyethylene layer as in conventional lithium ion separators.

Example Mats

In one embodiment the strength to thickness ratio of the nonwoven mat was optimized. The mat was comprised of approximately 48% by weight binder, 7% by weight polymer, and 45% by weight glass fibers, of which the larger glass fibers were roughly 4% by weight and the smaller glass fibers were roughly 41%. The nonwoven mat exhibited a strength that was 20% greater than the average of all the other samples that were produced at a thickness that was 65% less than the average of those samples. It is expected that similar results could be achieved by deviating the binder and glass fiber composition by 5% or so (i.e., 40-55% by weight binder, 5-15% by weight polymer, 40-50% by weight glass fibers that include 1-10% by weight larger glass fibers and 35-45% by weight smaller glass fibers).

In another embodiment the strength of the nonwoven mat was optimized. The nonwoven mat was comprised of approximately 50% by weight binder, 10% by weight polymer, and 40% by weight glass fibers, of which the larger glass fibers were roughly 2% by weight and the smaller glass fibers 38%. The resulting nonwoven mat exhibited a strength that was 80% greater than the average of all samples produced at a thickness that was 5% less than the average of those samples. It is expected that similar results could be achieved by deviating the binder, polymer, and glass fiber composition by 5% or so (i.e., 40-50% by weight binder, 5-15% by weight polymer, 35-45% by weight glass fibers including 1-5% by weight larger glass fibers and 35-45% by weight smaller glass fibers).

In yet another embodiment the polymer component of the nonwoven mat was controlled to yield an optimum melting response. The mat was comprised of approximately 20% by weight binder, 48% by weight polymer, and 32% by weight glass fibers, of which the larger glass fibers were roughly 1% by weight and the smaller glass fibers were roughly 31%. The resulting nonwoven mat exhibited a strength that was 75% greater than the average of all samples produced; however, the thickness about twice that of the average of those samples. The polymer percentage that was used in the nonwoven mat had the unexpected result of minimizing the air permeability in the nonwoven mat at both ambient temperatures as well as at temperatures above the melting point of the polymer. Air permeability was determined to decrease with increased polymer concentrations. At a polymer concentration of between 45-50% by weight, the air permeability of the nonwoven plateaued and slightly increased with further addition of the polymer. It is expected that similar results could be achieved by deviating the binder, polymer, and glass fiber composition by 5% or so (i.e., 15-25% by weight binder, 45-50% by weight polymer, 25-40% by weight glass fibers including 1-5% by weight larger glass fibers and 25-35% by weight smaller glass fibers).

In producing the above mats and other mats having the configurations described herein, it was determined that only a small amount of larger sized glass fibers is needed. For example, the strength of the nonwoven mat is significantly increased with the addition of only 1-3% of the larger sized glass fibers in comparison with a nonwoven mat that does not include any larger sized glass fibers. The addition of more than 3% of the larger sized glass fibers did not significantly increase the strength of the mat and decreased the strength of the mat if too high a percentage of the larger sized glass fibers were used. In some instances, the strength of the mats plateaued around the addition of 7% of the larger sized glass fibers. The increased strength is due to the larger sized glass fibers not forming as tight of a nonwoven mat as the smaller sized glass fibers would in the absence of the larger fibers. With a higher percent of larger sized glass fibers, the thickness and porosity of the mat of the nonwoven mat greatly increases, which typically results in lower strengths.

In producing the above mats and other mats having the configurations described herein, it was also determined that increasing the polymer component content in the nonwoven mat decreased the air permeability of the nonwoven mat, which is desired for Li-ion separators. The air permeability of the nonwoven mat decreased until the polymer component content in the nonwoven mat was approximately 50% by weight, after which the air permeability plateaued.

While several embodiments and arrangements of various components are described herein, it should be understood that the various components and/or combination of components described in the various embodiments may be modified, rearranged, changed, adjusted, and the like. For example, the arrangement of components in any of the described embodiments may be adjusted or rearranged and/or the various described components may be employed in any of the embodiments in which they are not currently described or employed. As such, it should be realized that the various embodiments are not limited to the specific arrangement and/or component structures described herein.

In addition, it is to be understood that any workable combination of the features and elements disclosed herein is also considered to be disclosed. Additionally, any time a feature is not discussed with regard in an embodiment in this disclosure, a person of skill in the art is hereby put on notice that some embodiments of the invention may implicitly and specifically exclude such features, thereby providing support for negative claim limitations.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A battery separator comprising:
   a nonwoven fiber mat having a thickness of between 0.1 and 20 mils, the nonwoven fiber mat being composed of a plurality of entangled microfibers including:
      between 20 and 70 weight percentage of smaller sized microfibers having an average fiber diameter of between 150 and 550 nanometers;
      between 1 and 10 weight percentage of larger sized microfibers having an average fiber diameter of between 0.6 and 6 microns; and
      between 10 and 60 weight percentage of a binder that binds the smaller sized microfibers and the larger sized microfibers together; and
   between 5 and 60 weight percentage of a polymer component, the polymer component having a melting point of between about 90 degrees Celsius and 150 degrees Celsius such that when exposed to a sufficiently high temperature, the polymer component melts and disrupts an electro-chemical reaction of a battery;
   wherein the battery separator exhibits a puncture resistance of at least 2 pounds per square inch and a strength of at least 0.8 pounds per inch.

2. The battery separator of claim 1, wherein the polymer component comprises polypropylene, polyethylene, or a combination thereof.

3. The battery separator of claim 2, wherein the polymer component includes polypropylene fibers, polyethylene fibers, or a combination thereof.

4. The battery separator of claim 2, wherein the polymer component is a polymer emulsion.

5. The battery separator of claim 1, wherein the plurality of entangled microfibers comprise glass microfibers.

6. The battery separator of claim 1, wherein the nonwoven fiber mat is substantially free of fibers having a diameter smaller than 150 nm.

7. The battery separator of claim 1, wherein the nonwoven fiber mat is substantially free of fibers having a diameter greater than 6 μm.

8. The battery separator of claim 1, wherein the smaller sized microfibers and the larger sized microfibers are substantially homogenously or uniformly distributed and blended throughout the nonwoven fiber mat.

9. The battery separator of claim 1, wherein the polymer component is homogenously dispersed within the nonwoven fiber mat such that the battery separator comprises a single layer structure.

10. A battery separator comprising:
    a nonwoven fiber mat having a thickness of between 0.1 and 20 mils, the nonwoven fiber mat being composed of a plurality of entangled microfibers having an average fiber diameter less than 6 microns;
    a binder that binds the microfibers together; and
    a polymer component having a melting temperature of between about 90 and 150 degrees Celsius;
    wherein the plurality of entangled microfibers includes microfibers having an average fiber diameter of between 150 and 550 nanometers; and
    wherein the plurality of entangled microfibers also includes microfibers having an average fiber diameter of between 0.6 and 6 microns.

11. The battery separator of claim 10, wherein the nonwoven fiber mat exhibits a puncture resistance of at least 2 pounds per square inch and a strength of at least 0.8 pounds per inch.

12. The battery separator of claim 10, wherein the battery separator includes between 5 and 60 weight percentage of the polymer component.

13. The battery separator of claim 10, wherein the polymer component includes or consists of polypropylene or polyethylene chains.

14. The battery separator of claim 10, wherein the nonwoven fiber mat is substantially free of fibers having a diameter smaller than 150 nm.

15. The battery separator of claim 14, wherein the nonwoven fiber mat is substantially free of fibers having a diameter greater than 6 μm.

16. The battery separator of claim 10, wherein the entangled microfibers comprise glass microfibers.

17. The battery separator of claim 10, wherein the polymer component is dispersed homogeneously through the plurality of entangled microfibers such that the polymer component is uniformly distributed throughout the nonwoven fiber mat and is not concentrated in any area within the nonwoven fiber mat such that the nonwoven fiber mat, binder, and polymer component form a single layered component.

18. A method of manufacturing a battery separator, the method comprising:
dispersing microfibers in a liquid to form an aqueous slurry of the microfibers;
dispersing a polymer component within the aqueous slurry of the microfibers;
distributing the aqueous slurry onto a screen and removing a liquid from the aqueous slurry so as to form a nonwoven fiber mat that is composed of entangled microfibers and the polymer component;
applying a binder to the entangled microfibers to bond the microfibers and polymer component together; and
drying the entangled microfibers to form a nonwoven fiber mat having a thickness of between 0.1 and 20 mils;
wherein the polymer component has a melting temperature of between about 90 and 150 degrees Celsius;
wherein dispersing the microfibers in the liquid comprises:
dispersing between 20 and 70 weight percentage of smaller sized microfibers in the liquid, the smaller sized microfibers having an average fiber diameter of between 150 and 550 nanometers; and
dispersing between 1 and 10 weight percentage of larger sized microfibers within the liquid, the larger sized microfibers having an average fiber diameter of between 0.6 and 6 microns.

19. The method of claim 18, wherein dispersing the polymer component within the aqueous slurry of the microfibers comprises dispersing between 5 and 60 weight percentage of the polymer component within the aqueous slurry.

20. The method of claim 18, wherein the polymer component is homogenously or uniformly distributed throughout the aqueous slurry of the microfibers.

* * * * *